(12) United States Patent
Duan et al.

(10) Patent No.: US 10,428,914 B2
(45) Date of Patent: Oct. 1, 2019

(54) CONTINUOUSLY VARIABLE TRANSMISSION

(71) Applicant: GM GLOBAL TECHNOLOGY OPERATIONS LLC, Detroit, MI (US)

(72) Inventors: Chengwu Duan, Shanghai (CN); Ying Huang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 15/526,884

(22) PCT Filed: Nov. 26, 2014

(86) PCT No.: PCT/CN2014/092305
§ 371 (c)(1),
(2) Date: May 15, 2017

(87) PCT Pub. No.: WO2016/082133
PCT Pub. Date: Jun. 2, 2016

(65) Prior Publication Data
US 2018/0080530 A1    Mar. 22, 2018

(51) Int. Cl.
*F16H 9/24* (2006.01)
*F16G 5/18* (2006.01)
(Continued)

(52) U.S. Cl.
CPC ............. *F16H 9/24* (2013.01); *F16G 5/18* (2013.01); *F16G 13/04* (2013.01); *F16G 13/08* (2013.01);
(Continued)

(58) Field of Classification Search
CPC ... F16H 9/24; F16H 9/18; F16H 55/30; F16H 55/36; F16G 5/18; F16G 13/04; F16G 13/08
See application file for complete search history.

(56) References Cited

U.S. PATENT DOCUMENTS 4,622,025 A * 11/1986 Kern .................. F16G 5/18
474/242
4,650,445 A * 3/1987 Mott .................. F16G 5/18
474/201
(Continued)

FOREIGN PATENT DOCUMENTS

CN    201705873 U    1/2011
CN    103133615 A    6/2013
(Continued)

*Primary Examiner* — William E Dondero
*Assistant Examiner* — Robert T Reese
(74) *Attorney, Agent, or Firm* — Quinn IP Law (57) ABSTRACT

The CVT includes a first pulley and a second pulley. Each of the first and second pulleys includes a first sheave, a second sheave, and a pulley axle operatively coupled between the first sheave and the second sheave. The first sheave can move relative to the second sheave along the pulley axle. Each of the first and second sheaves includes a sheave body and a plurality of sheave teeth protruding from the sheave body. The CVT further includes an endless rotatable device operatively coupled between the first and second pulleys. The endless rotatable device includes a plurality of pins interconnecting at least two of the links. The endless rotatable device further includes a plurality of device teeth each coupled to the pins.

17 Claims, 4 Drawing Sheets

(51) Int. Cl.
*F16G 13/04* (2006.01)
*F16G 13/08* (2006.01)
*F16H 55/30* (2006.01)
*F16H 55/56* (2006.01)
*F16H 9/18* (2006.01)

(52) U.S. Cl.
CPC ............... *F16H 9/18* (2013.01); *F16H 55/30* (2013.01); *F16H 55/56* (2013.01)

(56) References Cited

U.S. PATENT DOCUMENTS

| | | | | |
|---|---|---|---|---|
| 4,898,567 A * | 2/1990 | Tatara | ................. | F16G 5/18 474/174 |
| 5,263,903 A * | 11/1993 | Mott | ................. | F16G 5/18 474/213 |
| 6,203,460 B1 * | 3/2001 | Parks | ................. | F16G 5/18 474/206 |
| 9,028,350 B2 * | 5/2015 | Cho | ................. | F16H 55/54 474/47 |
| 9,765,883 B2 * | 9/2017 | Kanayama | ............ | F16H 63/065 |
| 10,132,391 B2 * | 11/2018 | Duan | ................. | F16H 9/00 |
| 10,295,056 B2 * | 5/2019 | Huang | ............. | F16H 61/66272 |
| 2006/0058143 A1 * | 3/2006 | Rickling | ................. | F16G 5/18 474/215 |
| 2008/0053733 A1 * | 3/2008 | Van Rooij | ............... | B21L 15/00 180/231 |
| 2011/0053717 A1 * | 3/2011 | Miura | ................. | F16H 9/18 474/46 |
| 2016/0281847 A1 * | 9/2016 | Kanayama | ............ | F16H 63/065 |

FOREIGN PATENT DOCUMENTS

| | | |
|---|---|---|
| CN | 103603934 A | 2/2014 |
| EP | 0177238 A1 | 4/1986 |
| JP | S6182038 A | 4/1986 |
| JP | 2004360899 A | 12/2004 |

* cited by examiner

CONTINUOUSLY VARIABLE TRANSMISSION

CROSS-REFERENCE TO RELATED APPLICATION

This application is a national phase of, and claims priority to, International Patent Application No. PCT/CN2014/092305, filed on Nov. 26, 2014, which is hereby incorporated by reference in its entirety.

INTRODUCTION

The present disclosure relates to a continuously variable transmission.

In general, a continuously variable transmission (CVT) is a transmission that can change steplessly through an infinite number of effective gear ratios between a maximum gear ratio and a minimum gear ratio. A typical continuously variable transmission includes two pulleys, each having two sheaves. A belt or any suitable endless rotatable device typically runs between the two pulleys, with the two sheaves of each of the pulleys sandwiching the belt therebetween. As used herein, the term "endless rotatable device" means a device, such as a cable or chain, without ends and capable of transferring torque when it rotates. Frictional engagement between the sheaves of each pulley and the belt couples the belt to each of the pulleys to transfer a torque from one pulley to the other. One of the pulleys may function as a drive pulley so that the other pulley can be driven by the drive pulley via the belt. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

SUMMARY

The present disclosure describes a CVT capable of operating several fixed speed ratios due to the positive engagement between teeth. Such operation of the CVT enhances its efficiency. In an embodiment, the CVT includes a first pulley and a second pulley. Each of the first and second pulleys includes a first sheave, a second sheave, and a pulley axle operatively coupled between the first sheave and the second sheave. The first sheave can move relative to the second sheave along the pulley axle. Each of the first and second sheaves includes a sheave body and a plurality of sheave teeth protruding from the sheave body. The CVT further includes an endless rotatable device operatively coupled between the first and second pulleys. The endless rotatable device includes a linkage assembly having a plurality of links interconnected to each other. The linkage assembly has a linkage width and includes a plurality of pins interconnecting at least two of the links. Each of the pins includes a first end portion and a second end portion opposite to the first end portion. The first end portion and/or the second end portion of the pins extend beyond the linkage width. The endless rotatable device further includes a plurality of device teeth each coupled to the first end portion and/or the second end portion of one of the pins. The device teeth are configured to engage the sheave teeth. In another embodiment, the pulley axle has an axle body and a plurality of axle teeth protruding from the axle body instead of (or in addition to) the sheave teeth. In another embodiment, the endless rotatable device includes toothed links instead of (or in addition to) the device teeth.

The above features and advantages and other features and advantages of the present teachings are readily apparent from the following detailed description of the best modes for carrying out the teachings when taken in connection with the accompanying drawings.

DETAILED DESCRIPTION

Figure 1:
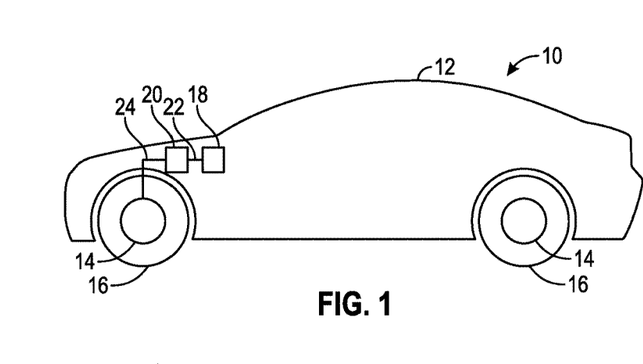
FIG. 1 is a schematic, side view of a vehicle including a CVT in accordance with an embodiment of the present disclosure.

Referring to the drawings, wherein like reference numbers correspond to like or similar components throughout the several figures, FIG. 1 schematically illustrates a vehicle 10 including a vehicle body 12 and a plurality of wheels 14 operatively coupled to the vehicle body 12. Each wheel 14 is coupled to a tire 16. The vehicle 10 may be a car and additionally includes an internal combustion engine 18 and a continuously variable transmission (CVT) 20 operatively coupled to the internal combustion engine 18. The internal combustion engine 18 can provide power to the wheels 14 in order to propel the vehicle 10. The CVT 20 can transmit torque from the internal combustion engine 18 to the wheels 14 at different speed ratios. The CVT 20 includes an input transmission member 22, such as a shaft, operatively coupled to the internal combustion engine 18 and an output transmission member 24, such as a shaft, operatively coupled to the wheels 14. In the present disclosure, the "speed ratio of the CVT" refers the ratio of the angular speed of the input transmission member 22 to the angular speed of the output transmission member 24. Although the CVT 20 is described in connection with the vehicle 10, it is contemplated that the CVT 20 may be used in non-automotive applications. For example, the CVT 20 may be coupled to a stationary power source such a stationary engine.

Figure 2:
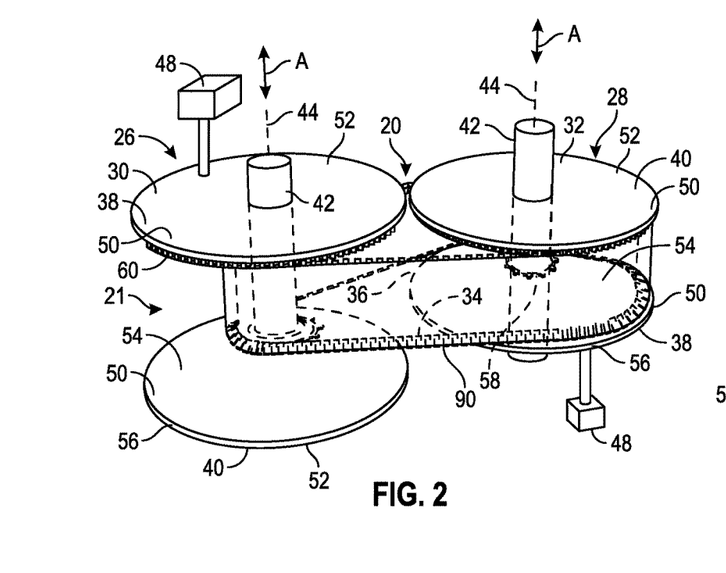
FIG. 2 is a schematic, perspective view of the CVT schematically shown in FIG. 1.
Figure 3:
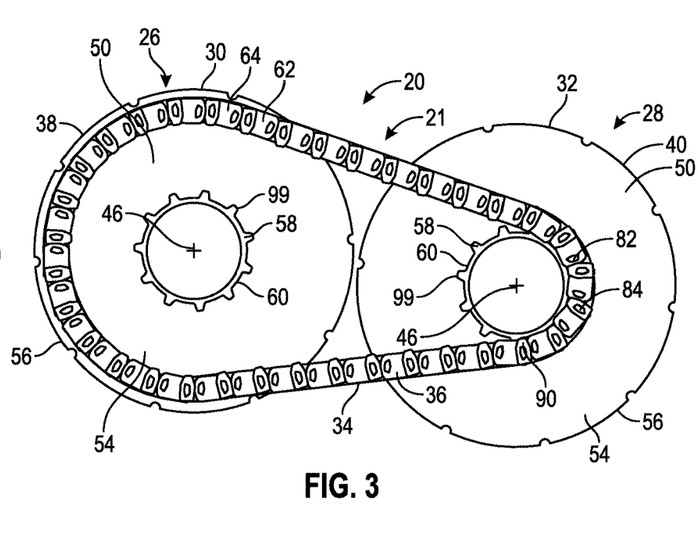
FIG. 3 is a schematic, front view of the CVT shown in FIG. 2.
Figure 4:
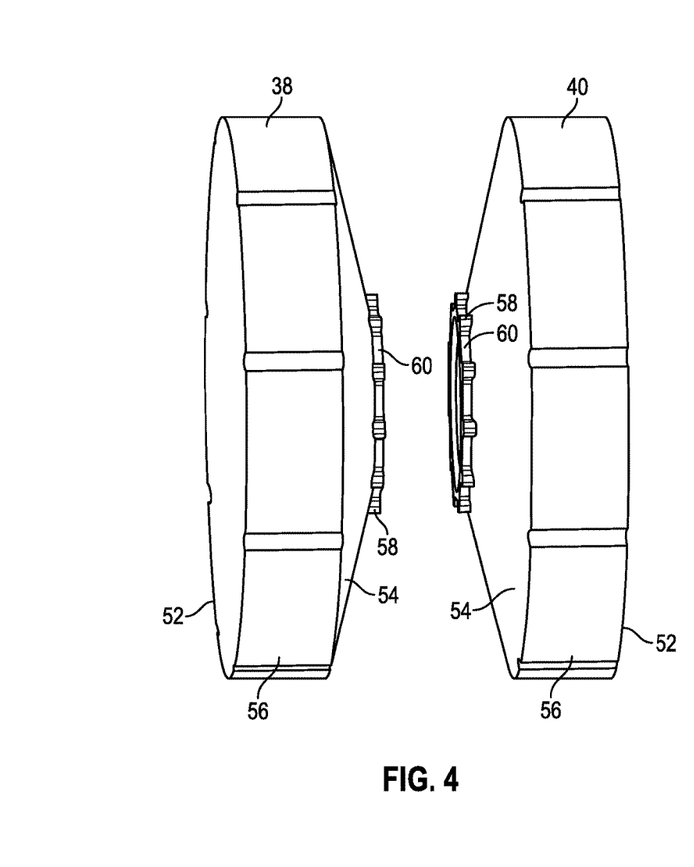
FIG. 4 is a schematic, perspective view of two sheaves of one of the pulleys of the CVT shown in FIG. 2.

With reference to FIGS. 2-4, the CVT 20 can transmit torque from the internal combustion engine 18 to the wheels 14 and includes a driving member 26 operatively coupled to input transmission member 22 and a driven member 28 operatively coupled to the output transmission member 24. The driving member 26 can receive input torque from the internal combustion engine 18 via the input transmission member 22, and the driven member 28 can transmit output torque to the wheels 14 via the output transmission member 24. The driving member 26 may be configured as a first or input pulley 30, and the driven member 28 may be configured as a second or output pulley 32. The structure and operation of the first pulley 30 and the second pulley 32 may be substantially similar or identical. Accordingly, the first pulley 30 and the second pulley 32 may have the same components. In addition to the first and second pulleys 30, 32, the CVT 20 includes an endless rotatable device 34 capable of transferring torque. As used herein, the term "endless rotatable device" means a device, such as a belt or chain, without ends and capable of transferring torque when it rotates. In the depicted embodiment, the endless rotatable device 34 is a chain 36. The endless rotatable device 34 (e.g. chain 36) rotatably couples the first pulley 30 to the second pulley 32. In other words, the endless rotatable device 34 operatively interconnects the first and second pulleys 30, 32. Because the endless rotatable device 34 is coupled between the first pulley 30 and the second pulley 32, the rotation of the first pulley 30, which is driven by the internal combustion engine 18, causes the second pulley 32 to rotate. The endless rotatable device 34, the first pulley 30, and the second pulley 32 may be collectively referred to as a variator 21.

With continued reference to FIGS. 2-4, each of the first pulley 30 and the second pulley 32 includes a first or movable sheave 38, a second or stationary sheave 40, and a pulley axle 42. The pulley axles 42 may be shafts or pins and both extend along respective pulley axes 44. In the depicted embodiment, however, the pulley axle 42 of the first pulley 30 is rotationally coupled to the internal combustion engine 18. Accordingly, the pulley axle 42 of the first pulley 30 can receive input torque from the internal combustion engine 18. Rotating the pulley axle 42 about the pulley axis 44 causes the first pulley 30 and the second pulley 32 to rotate about the pulley axis 44. Each pulley axle 42 defines a respective pulley center 46 (FIG. 3) and is rotationally coupled between the first and second sheaves 38, 40. The pulley axes 44 intersect the respective pulley centers 46. However, the pulley axis 44 of the first pulley 30 is substantially parallel to the pulley axis 44 of the second pulley 32.

The first sheave 38 may also be referred to as the first or movable pulley portion, and the second sheave 40 may also be referred to as the second or stationary pulley portion. The first sheave 38 and the second sheave 40 may have a substantially frusto-conical shape and are both configured to rotate about their respective pulley axles 42. However, the second sheave 40 is fixed to the corresponding pulley axle 42 and, therefore, cannot move along the corresponding pulley axis 44. In other words, the second sheave 40 is configured to remain axially stationary relative to the pulley axis 44 defined by the pulley axle 42. The first sheave 38, on the other hand, can move axially along the pulley axis 44 defined by the pulley axle 42 along the direction indicated by double arrows A. Thus, the first sheave 38 can move toward and away from the second sheave 40.

The CVT 20 further includes one or more sheave actuators 48 operatively coupled to the first pulley 30, the second pulley 32, or both. In the depicted embodiment, one sheave actuator 48 can apply a force to the first sheave 38 of the second pulley 32 to move the first sheave 38 toward or away from the second sheave 40 of the second pulley 32 along the direction indicated by double arrows A. Another sheave actuator 48 can apply a force to the first sheave 38 of the first pulley 30 to move the first sheave 38 toward or away from the second sheave 40 of the first pulley 30 along the direction indicated by double arrows A. Alternatively, a plate or any other suitable coupling (not shown) can interconnect the first sheaves 38 of the first pulley 30 and the second pulley 32 so that only one sheave actuator 48 is needed. In such case, the application of the force by the sheave actuator 48 to the first sheave 38 of the first pulley 30 also causes the first sheave 38 of the second pulley 32 to move relative to the pulley axis 44.

Each of the first and second sheaves 38 and 40 has a sheave body 50 having a substantially frusto-conical shape. Each sheave body 50 defines an outer sheave surface 52 and an inner sheave surface 54 opposite the outer sheave surface 52. The outer sheave surface 52 is substantially flat, whereas the inner sheave surface 54 is obliquely angled relative to the outer sheave surface 52 and the pulley axis 44. The sheave body 50 additionally defines an annular lateral surface 56 interconnecting the outer sheave surface 52 and the inner sheave surface 54.

Each of the first and second sheaves 38, 40 further includes a plurality of sheave teeth 58 arranged annularly around the pulley center 46. Although the drawings show that each of the first and second sheave 38, 40 includes one set of annularly arranged sheave teeth 58, it is contemplated that each sheave 38, 40 may include more than one set of annularly arranged sheave teeth 58. The sheave teeth 58 protrude from the sheave body 50. Specifically, the sheave teeth 58 protrude from the inner sheave surface 54 in a direction away from the outer sheave surface 52 and in a direction away from the pulley center 46. Accordingly, in this embodiment, the sheave teeth 58 remain stationary relative to the sheave (i.e., the first sheave 38 or the second sheave 40) to which they are attached. Moreover, the sheave teeth 58 may be discrete components coupled to the sheave body 50 or may be part of the corresponding sheave 38, 40 that are monolithically formed with the sheave body 50.

As discussed above, the sheave teeth 58 are annularly arranged around the pulley center 46 and may be interconnected by an annular structure 60 to enhance the connection between the sheave teeth 58 and the sheave body 50. The annular structure 60 protrudes from the sheave body 50, and the sheave teeth 58 protrude from the annular structure 60 in a direction away from the pulley center 46. Specifically, the annular structure 60 protrudes from the inner sheave surface 54 in a direction away from the outer sheave surface 52.

Figure 5:
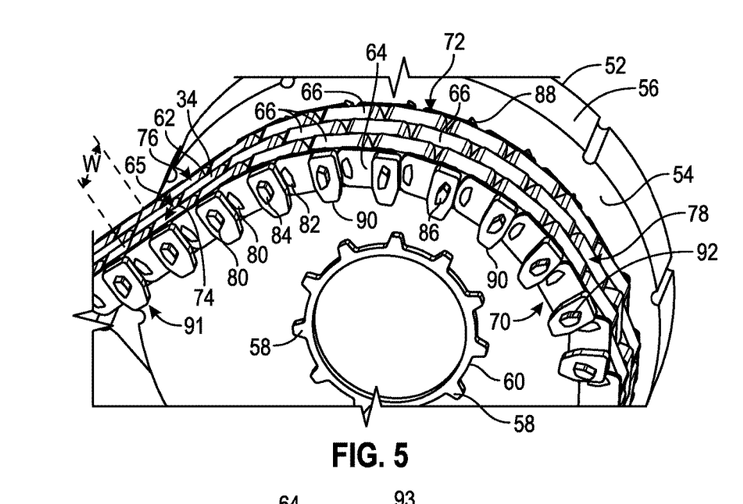
FIG. 5 is a schematic, perspective, fragmentary view of an endless rotatable device and a sheave of the CVT shown in FIG. 2.
Figure 6:
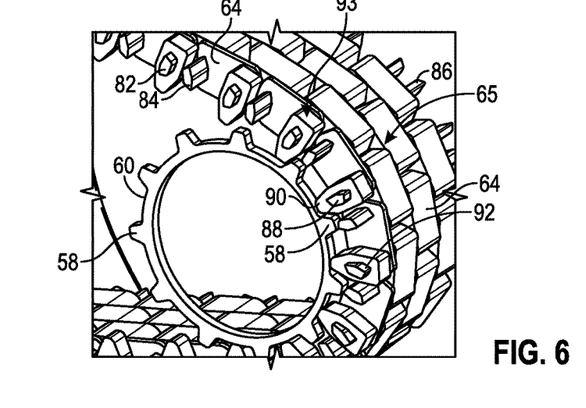
FIG. 6 is a schematic, perspective, fragmentary view of the CVT shown in FIG. 2, depicting device teeth of the endless rotatable device positively engaged with sheave teeth of a sheave.

With reference to FIGS. 3, 5, and 6, the endless rotatable device 34 includes a linkage assembly 62 having a plurality of outer links 64 and inner links 66. The outer links 64 may be chain links and may be arranged in rows. For example, the outer links 64 include a first outer row 70 of outer links 64 and a second outer row 72 of outer links 64. The linkage assembly 62 has a linkage width W extending from the first outer row 70 of outer links 64 to the second outer row 72 of the outer links 64. Accordingly, the first outer row 70 and second outer row 72 of outer links 64 define the outer lateral periphery of the linkage assembly 62.

With specific reference to FIG. 5, the inner links 66 may be chain links and are also arranged in rows. As a non-limiting example, the linkage assembly 62 includes a first inner row 74 of inner links 66, a second inner row 76 of inner links 66, and a third inner row 78 of inner links 66 disposed between the first inner row 74 and the second inner row 76 of inner links 66. It is contemplated, however, that the linkage assembly 62 may include more or fewer rows of inner links 66. Irrespective of the quantity, the inner rows (e.g., the first inner row 74, the second inner row 76, and the third inner row 78) of the inner links 66 are disposed between the first outer row 70 and second outer row 72 of outer links 64. The outer links 64 and the inner links 66 may be collectively referred to as the links 65.

The endless rotatable device 34 further includes a plurality of pins 80 interconnecting the links 65. Each pin 80 extends along the entire linkage width W in order to interconnect the links 65. For example, each pin 80 interconnects at least two links 65. In the depicted embodiment, each pin 80 can directly interconnect one outer link 64 in the first outer row 70, one outer link 64 in the second outer row 72, one inner link 66 in the first inner row 74, one inner link 66 in the second inner row 76, and one inner link 66 in the third inner row 78. The pins 80 rotatably connect overlapping links 65. As such, the links 65 can rotate (e.g., swing) about the pin 80.

In the depicted embodiment, the endless rotatable device 34 includes two kinds of pins 80 (i.e., the link coupling pin 82 and the teeth coupling pins 84). The link coupling pins 82 extend across the entire linkage width W of the linkage assembly 62 in order to couple the overlapping links 65 to each other but does not necessarily extend beyond the first outer row 70 and second outer row 72 of outer links 64. However, as shown in FIG. 6, the teeth coupling pins 84 may extend beyond the first outer row 70 and second outer row 72 of outer links 64.

The teeth coupling pins 84 extend across the entire linkage width W of the linkage assembly 62 in order to couple the overlapping links 65. In addition, the teeth coupling pins 84 extend beyond the first outer row 70 and second outer row 72 of outer links 64. Each tooth coupling pin 84 includes a first end portion 86 and a second end portion 88 opposite the first end portion 86. The first and second end portions 86, 88 of the teeth coupling pins 84 extend beyond the linkage width W (i.e., beyond the first outer row 70 and second outer row 72 of outer links 64).

The endless rotatable device 34 includes a plurality of device teeth 90 each configured, shaped, and sized to engage (e.g., mate) with the sheave teeth 58. Consequently, the rotation of the first or second pulleys 30, 32 causes the rotation of the endless rotatable device 34 or vice-versa. In other words, when the device teeth 90 engage (e.g., mate with) the sheave teeth 58, rotating the first pulley 30 about its pulley axis 44 causes the endless rotatable device 34 to rotate. In turn, rotating the endless rotatable device 34 causes the second pulley 32 to rotate about its pulley axis 44. Accordingly, the CVT 20 has a fixed speed ratio when the device teeth 90 are engaging the sheave teeth 58. When the device teeth 90 are not engaging the sheave teeth 58, the torque is transferred between the first and second pulleys 30, 32 due to the friction between the endless rotatable device 34 and the first and second pulleys 30, 32. At this time, the sheave actuators 48 (FIG. 2) can apply a clamping force on the first and second pulleys 30, 32 in order to maximize the friction between the endless rotatable device 34 and the first and second pulleys 30, 32. However, less clamping force is needed to transfer torque between the endless rotatable device 34 and the first and second pulleys 30, 32 when the device teeth 90 are positively engaging the sheave teeth 58 than when the device teeth 90 are not positively engaging the sheave teeth 58. Therefore, incorporating the device teeth 90 to the endless rotatable device 34 and the sheave teeth 58 to the first and second pulleys 30, 32 maximizes the efficiency of the variator 21.

The device teeth 90 are directly coupled to the first end portion 86 and the second end portion 88 of the teeth coupling pins 84. A first group 91 of device teeth 90 is coupled to the first end portion 86 of the teeth coupling pins 84, and a second group 93 is coupled to the second end portion 88 of the teeth coupling pins 84. In the depicted embodiment, each device tooth 90 has a pin receiving opening 92 configured, shaped, and sized to receive the first end portion 86 or the second end portion 88 of at least one tooth coupling pin 84. The first end portion 86 (or the second end portion 88) of the teeth coupling pins 84 extend through the pin receiving opening 92, thereby coupling the device teeth 90 to the linkage assembly 62. Accordingly, the device teeth 90 are outside the linkage width W and adjacent the first outer row 70 and/or second outer row 72 of outer links 64.

During operation of the CVT 20, the internal combustion engine 18 transmits input torque to the first pulley 30, causing the first pulley 30 to rotate about its pulley center 46. As the first pulley 30 rotates, the inner sheave surface 54 contacts the endless rotatable device 34, and the friction between inner sheave surface 54 and the endless rotatable device 34 causes the endless rotatable device 34 to rotate. Because the endless rotatable device 34 is rotationally coupled to the second pulley 32, rotating the endless rotatable device 34 causes the second pulley 32 to rotate about its pulley axis 44. While the endless rotatable device 34 is rotating, the sheave actuators 48 may apply a force to the first sheaves 38 of the first and second pulley 30, 32 in order to move the first sheaves 38 toward or away from the respective second sheaves 40 and in order to vary the speed ratio of the CVT 20. As the first sheave 38 of the first or second pulley 30, 32 moves toward the second sheave 40, the engagement between the inner sheave surface 54 and the endless rotatable device 34 causes the endless rotatable device 34 to move away from the pulley axis 44 or pulley center 46. Conversely, as the first sheave 38 of the first or second pulley 30, 32 moves away from the second sheave 40, the engagement between the inner sheave surface 54 and the endless rotatable device 34 causes the endless rotatable device 34 to move toward the pulley axis 44 or pulley center 46. In other words, the endless rotatable device 34 is movable toward and away from the pulley center 46 as the first sheave 38 is movable toward and away from the second sheave 40.

While the internal combustion engine 18 drives the first pulley 30, the friction between the inner sheave surfaces 54 of the first pulley 30 drives the endless rotatable device 34. The endless rotatable device 34 then transmits torque from the first pulley 30 to the second pulley 32. Next, the friction between inner sheave surfaces 54 of the second pulley 32 and the endless rotatable device 34 drives the second pulley 32. However, in addition to friction, the positive engagement between the sheave teeth 58 and the device teeth 90 may also drive the endless rotatable device 34 and the second pulley 32.

As discussed above, the internal combustion engine 18 drives the first pulley 30. As a result, the first pulley 30 rotates about its pulley axis 44. While the first pulley 30 rotates about its first pulley axis 44, the sheave actuator 48 applies a force to the first sheave 38, thereby moving the first sheave 38 toward or away from the second sheave 40 along the pulley axis 44. Consequently, the endless rotatable device 34 moves toward and away from the pulley axle 42. At some point, the endless rotatable device 34 is close enough to the sheave teeth 58 such that the device teeth 90 mate with the sheave teeth 58. When the device teeth 90 mate with the sheave teeth 58, the positive engagement between the device teeth 90 and the sheave teeth 58 (rather than the friction between inner sheave surface 54 of the first pulley 30 and the endless rotatable device 34) allows the first pulley 30 to transmit torque to the endless rotatable device 34. The sheave teeth 58 may be annularly arranged around the pulley axles 42 of the first and second pulleys 30, 32 such that the CVT 20 operates at its maximum speed ratio when the device teeth 90 mate with the sheave teeth 58 of the first pulley 30. The operation of the CVT 20 as described above can minimize the fuel consumption of the vehicle 10. In addition, the structure and operation of the CVT 20 as described above maximizes the capacity to transmit torque from the internal combustion engine 18 to the wheels 14 via the CVT 20, because the CVT 20 operates at a fixed speed ratio when the device teeth 90 directly contact the sheave teeth 58.

Figure 7:
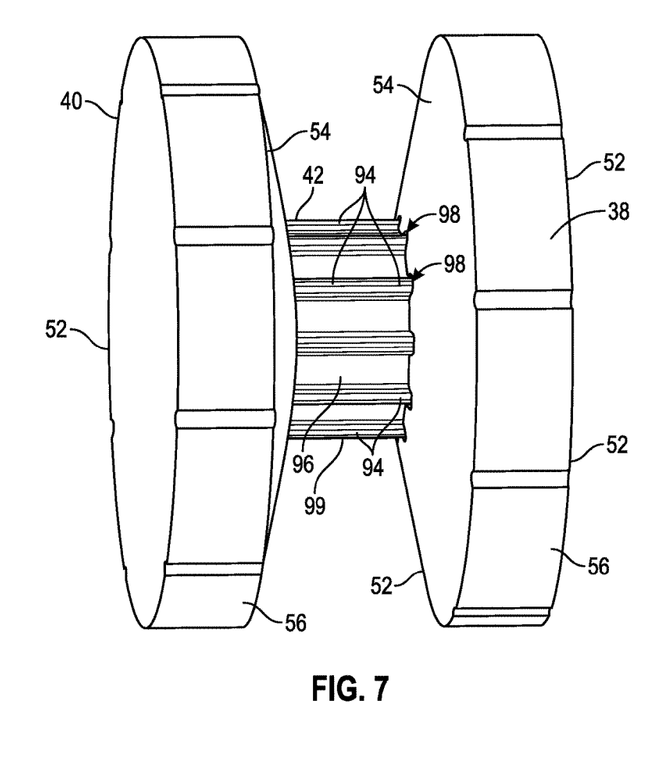
FIG. 7 is a schematic, perspective view of a pulley for the CVT shown in FIG. 2 in accordance with another embodiment of the present disclosure, wherein the pulley axle includes axle teeth.
Figure 8:
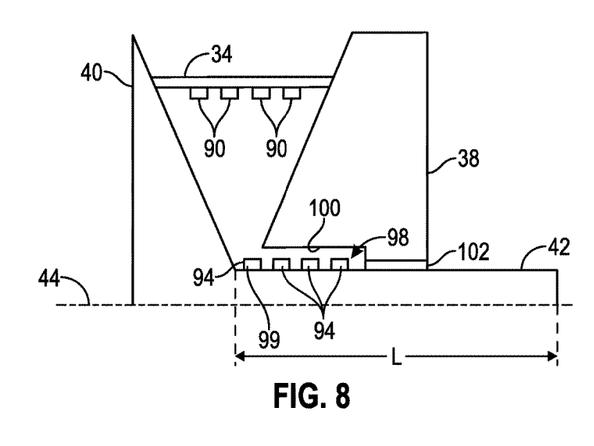
FIG. 8 is a schematic, side, fragmentary view of a pulley and the endless rotatable device in an accordance with an embodiment of the present disclosure, wherein the movable sheave is disposed in a first sheave position and over the axle teeth.

With reference to FIG. 7, the device teeth 90 can directly engage (e.g., mate with) axle teeth 94 of the pulley axle 42 instead of (or in addition to) the sheave teeth 58 described above. In this embodiment, each pulley axle 42 includes an axle body 96, and the axle teeth 94 protrude outwardly from the axle body 96 in a direction away from the pulley center 46 (FIG. 3). The axle body 96 may be substantially cylindrical, and the axle teeth 94 are annularly arranged around the axle body 96. In the depicted embodiment, the axle teeth 94 and the axle body 96 collectively form a one-piece structure. However, the axle teeth 94 may alternatively be configured as discrete components coupled to the axle body 96. Regardless of their configuration, the axle teeth 94 may be substantially linear and may be elongated along the length L (FIG. 8) of the axle body 96. Alternatively, each axle tooth 94 may have an annular shape and extends around the circumference of the axle body 96. Irrespective of their particular shape, the axle teeth 94 are configured, shaped, and sized to engage (e.g., mate with) the device teeth 90 in order to drive (or be driven) by the endless rotatable device 34. The axle teeth 94 and/or the sheave teeth 58 may generally be referred to as pulley teeth 99.

As discussed above, the first sheave 38 is axially movable relative to the second sheave 40 along the pulley axis 44. In order to move axially without interfering with the axle teeth 94, the first sheave 38 defines at least one recess 98 configured, shaped, and sized to receive the axle teeth 94. In the embodiment, shown in FIG. 7, for example, the first sheave 38 has a plurality of annularly arranged recesses 98 each configured to receive one axle tooth 94. In the embodiment shown in FIGS. 8 and 9, the first sheave 38 defines at least one annular shaped recess 98 configured to receive all the axle teeth 94. Regardless of the quantity, the recesses 98 are defined by an interior sheave surface 100 that is opposite to the annular lateral surface 56. A bearing 102 may be disposed between the pulley axle 42 and the first sheave 38 to facilitate the axial movement of the first sheave 38 relative to the pulley axle 42.

Figure 9:
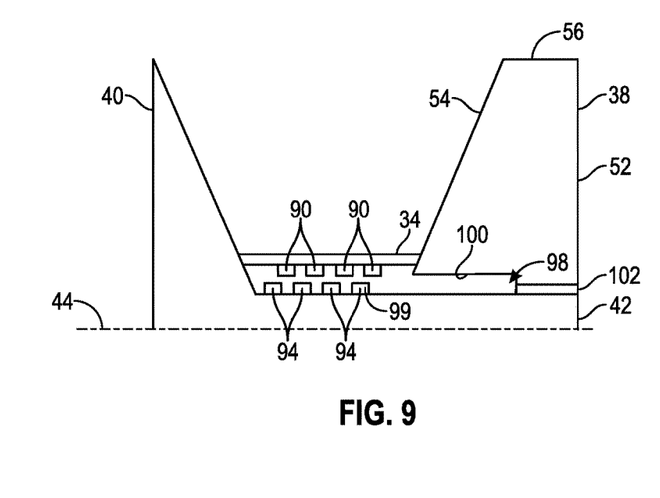
FIG. 9 is a schematic, side, fragmentary view of the pulley and the endless rotatable device shown in FIG. 8, wherein the movable sheave is disposed in a second sheave position.

In operation, the first sheave 38 can move toward and away from the second sheave 40 along the pulley axle 42 between a first sheave position (FIG. 8) and a second sheave position (FIG. 9). When the first sheave 38 is in the first sheave position relative to the second sheave 40, the first sheave 38 is disposed over at least some of axle teeth 94 and the recess 98 receives the axle teeth 94. When the first sheave 38 is in the second sheave position relative to the second sheave 40, the first sheave 38 does not necessarily overlap the axle teeth 94 and the recess 98 does not necessarily receive the axle teeth 94.

Figure 10:
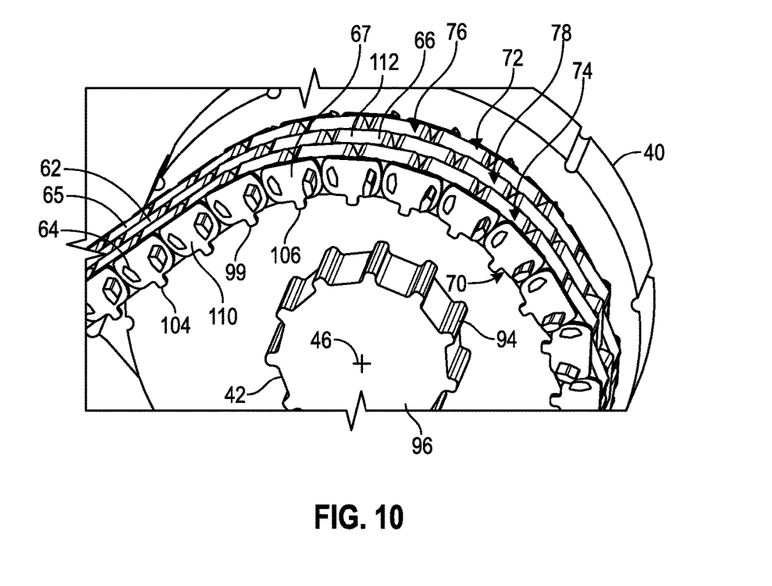
FIG. 10 is a schematic, perspective, fragmentary view of a sheave and an endless rotatable device, illustrating outer links having link teeth.
Figure 11:
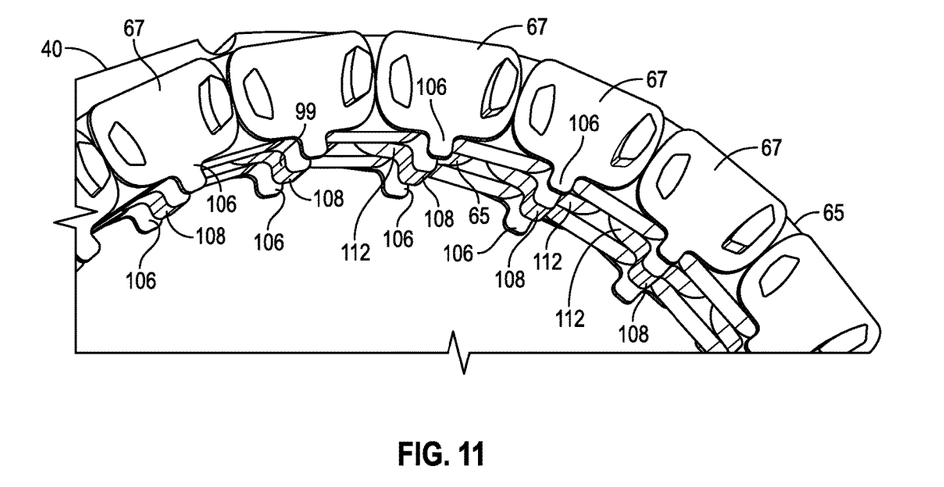
FIG. 11 is a schematic, perspective, fragmentary view of a sheave and an endless rotatable device, illustrating inner links having link teeth.

With reference to FIGS. 10 and 11, the linkage assembly 62 may include link teeth 104 instead of (or in addition to) the device teeth 90 (FIG. 5). The link teeth 104 are configured, shaped, and sized to engage (e.g., mate with) the axle teeth 94 and/or the sheave teeth 58. The link teeth 104 may be part of some or all the outer links 64 disposed along the first outer row 70 and/or the second outer row 72. Alternatively or additionally, the link teeth 104 may be part of some or all the inner links 66. Accordingly, the link teeth 104 may include outer link teeth 106 and/or inner link teeth 108.

With specific reference to FIG. 11, at least some of the inner links 66 include an inner link body 112 and an inner link tooth 108 protruding from the inner link body 112 in a direction toward the pulley center 46 (FIG. 10). Each inner link tooth 108 is configured, shaped, and sized to engage (e.g., mate with) the axle teeth 94 and/or the sheave teeth 58. In the depicted embodiment, only the inner links 66 disposed along the third inner row 78 (FIG. 10) include inner link teeth 108 in order to minimize costs. Specifically, all the inner links 66 disposed along the third inner row 78 include inner link teeth 108. However, it is contemplated that more or fewer inner links 66 may include inner link teeth 108. For example, all the inner links 66 may include inner link teeth 108. The links 65 (i.e., outer links 64 and/or the inner links 66) that include link teeth 104 are referred to as toothed links 67. Accordingly, each toothed link 67 includes at least one link tooth 104.

While the best modes for carrying out the teachings have been described in detail, those familiar with the art to which this disclosure relates will recognize various alternative designs and embodiments for practicing the teachings within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:
1. A continuously variable transmission (CVT), comprising:
    a first pulley;
    a second pulley;
    wherein each of the first and second pulleys includes:
        a first sheave;
        a second sheave;
        a pulley axle operatively coupled between the first sheave and the second sheave, the first sheave being movable relative to the second sheave along the pulley axle,
    wherein each of the first and second sheaves includes:
        a sheave body; and
        a plurality of sheave teeth protruding from the sheave body;

an endless rotatable device operatively coupled between the first and second pulleys, wherein the endless rotatable device includes:
  a linkage assembly including a plurality of links, wherein the linkage assembly has a linkage width;
  a plurality of pins interconnecting at least two of the plurality of links, wherein each of the pins includes a first end portion and a second end portion opposite the first end portion, and at least one of the first end portion and the second end portion extends beyond the linkage width; and
  a plurality of device teeth each coupled to at least one of the first end portion and the second end portion of one of the plurality of pins, wherein the device teeth are configured to engage the sheave teeth;
  wherein a first group of the device teeth are directly coupled to the first end portion of the pins, and a second group of the device teeth are directly coupled to the second end portion of the pins.

2. The CVT of claim 1, wherein the pulley axle defines a pulley center, and the sheave teeth are arranged annularly about the pulley center.

3. The CVT of claim 2, wherein each of the first and second sheaves includes an annular structure directly coupled to the sheave teeth.

4. The CVT of claim 3, wherein the sheave teeth protrude from the annular structure.

5. The CVT of claim 4, wherein the sheave teeth protrude from the annular structure away from the pulley center.

6. The CVT of claim 5, wherein each of the first and second sheaves defines an outer sheave surface and an inner sheave surface opposite the outer sheave surface, wherein the annular structure protrudes from the inner sheave surface away from the outer sheave surface.

7. The CVT of claim 1, wherein the first and second end portions extend beyond the linkage width.

8. A continuously variable transmission (CVT), comprising:
  a first pulley;
  a second pulley;
  wherein each of the first and second pulleys includes:
    a first sheave;
    a second sheave;
    a pulley axle operatively coupled between the first sheave and the second sheave, the first sheave being movable relative to the second sheave along the pulley axle, wherein the pulley axle includes:
      an axle body; and
      a plurality of axle teeth protruding from the axle body, the plurality of axle teeth being annularly arranged around the axle body;
  an endless rotatable device operatively coupled between the first and second pulleys, wherein the endless rotatable device includes:
    a linkage assembly including a plurality of links, wherein the linkage assembly has a linkage width;
    a plurality of pins interconnecting at least two of the plurality of links, wherein each of the pins includes a first end portion and a second end portion opposite the first end portion, and at least one of the first end portion and the second end portion extends beyond the linkage width; and
    a plurality of device teeth each coupled to at least one of the first end portion and the second end portion of one of the plurality of pins, wherein the device teeth are configured to engage the axle teeth;
    wherein a first group of the device teeth are directly coupled to the first end portion of the pins, and a second group of the device teeth are directly coupled to the second end portion of the pins.

9. The CVT of claim 8, wherein the axle teeth extend along a length of the pulley axle.

10. The CVT of claim 8, wherein the first sheave defines an annular lateral surface and an interior sheave surface opposite the annular lateral surface, the interior sheave surface defines at least one recess, and the at least one recess is sized to receive the axle teeth.

11. The CVT of claim 10, wherein the first sheave is movable relative to the second sheave along the pulley axle between a first sheave position and a second sheave position, and the at least one recess receives the axle teeth when the first sheave is in the first sheave position.

12. The CVT of claim 11, wherein the at least one recess does not receive the axle teeth when the first sheave is in the second sheave position.

13. The CVT of claim 8, wherein the pulley axle defines a pulley center, and the axle teeth are arranged annularly about the pulley center.

14. A continuously variable transmission (CVT), comprising:
  a first pulley;
  a second pulley, wherein each of the first and second pulleys includes pulley teeth;
  wherein each of the first and second pulleys includes:
    a first sheave;
    a second sheave;
    a pulley axle operatively coupled between the first sheave and the second sheave, wherein the first sheave is movable relative to the second sheave along the pulley axle; and
  an endless rotatable device operatively coupled between the first and second pulleys, wherein the endless rotatable device includes:
    a plurality of links interconnected to each other, wherein the plurality of links includes:
      a plurality of toothed links including link teeth, wherein the link teeth are configured to engage the pulley teeth;
      wherein endless rotatable device includes a linkage assembly formed by the plurality of links, the linkage assembly has a linkage width, and the plurality of links includes outer links arranged along a first outer row and a second outer row, and the linkage width extends from the first outer row to the second outer row;
      wherein the plurality of links includes inner links disposed between the first outer row and the second outer row of outer links, the inner links are arranged along a first inner row, a second inner row, and a third inner row disposed between the first inner row and second inner row, and the toothed links include the inner links arranged along the third inner row.

15. The CVT of claim 14, wherein the toothed links include the outer links arranged along the first outer row and the second outer row.

16. The CVT of claim 15, wherein the plurality of links includes inner links disposed between the first outer row and the second outer row, and toothed links include the inner links.

17. The CVT of claim 14, wherein the plurality of links includes inner links disposed between the first outer row and the second outer row of outer links, and the inner links are arranged along at least one inner row disposed between the first outer row and the second outer row of outer links, and the toothed links include the inner links.

\* \* \* \* \*